United States Patent [19]
Badejo et al.

[11] Patent Number: 5,972,099
[45] Date of Patent: Oct. 26, 1999

[54] PROCESS FOR PREPARING ORGANIC PIGMENT COMPOSITIONS

[75] Inventors: Ibraheem T. Badejo, North Charleston; Daphne J. Rice, Charleston; Michael J. Greene, Mt. Pleasant, all of S.C.

[73] Assignee: Bayer Corporation, Pittsburgh, Pa.

[21] Appl. No.: 08/991,980

[22] Filed: Dec. 17, 1997

[51] Int. Cl.$^6$ .............................. C08K 5/17; C09B 48/00; C09B 67/52

[52] U.S. Cl. .................. 106/494; 106/493; 106/495; 106/497; 106/498; 106/500; 106/31.6; 106/31.75; 546/49; 546/56

[58] Field of Search ................................. 106/493, 494, 106/495, 497, 498, 500, 31.6, 31.75; 546/49, 56

[56] References Cited

U.S. PATENT DOCUMENTS

| | | | |
|---|---|---|---|
| 3,275,637 | 9/1966 | West | 106/495 |
| 3,342,828 | 9/1967 | Vorobjeva et al. | 546/137 |
| 4,256,507 | 3/1981 | Kranz et al. | 106/495 |
| 4,310,359 | 1/1982 | Ehashi et al. | 106/494 |
| 4,439,240 | 3/1984 | Ganci | 106/495 |
| 4,455,173 | 6/1984 | Jaffe | 106/495 |
| 4,478,968 | 10/1984 | Jaffe | 524/88 |
| 4,541,872 | 9/1985 | Jaffe | 106/495 |
| 4,844,742 | 7/1989 | Jaffe | 106/448 |
| 4,895,949 | 1/1990 | Jaffe et al. | 546/56 |
| 4,929,279 | 5/1990 | Hays | 106/412 |
| 5,137,576 | 8/1992 | Macholdt et al. | 106/495 |
| 5,145,524 | 9/1992 | Ganci | 106/493 |
| 5,194,088 | 3/1993 | Bäbler et al. | 106/412 |
| 5,229,515 | 7/1993 | Pfenninger et al. | 546/49 |
| 5,264,032 | 11/1993 | Dietz et al. | 106/411 |
| 5,286,863 | 2/1994 | Bäbler et al. | 546/56 |
| 5,334,727 | 8/1994 | Campbell | 548/373.1 |
| 5,366,546 | 11/1994 | McCrae et al. | 106/410 |
| 5,368,641 | 11/1994 | Dietz et al. | 106/495 |
| 5,424,429 | 6/1995 | Hendi et al. | 546/49 |
| 5,453,151 | 9/1995 | Bäbler | 106/497 |
| 5,457,205 | 10/1995 | Hendi et al. | 546/56 |
| 5,683,502 | 11/1997 | Badejo et al. | 106/495 |
| 5,698,024 | 12/1997 | Badejo et al. | 106/495 |
| 5,711,800 | 1/1998 | Badejo et al. | 106/495 |
| 5,713,999 | 2/1998 | Badejo et al. | 106/495 |
| 5,728,206 | 3/1998 | Badejo | 106/493 |
| 5,741,356 | 4/1998 | Badejo et al. | 106/493 |
| 5,755,873 | 5/1998 | Badejo et al. | 106/495 |

FOREIGN PATENT DOCUMENTS 63-305172  12/1988  Japan.

OTHER PUBLICATIONS

Chemical Abstracts, p. 83, vol. 104, 1986 (month unavailable) No. 104:226422s, Organic pigments for gravure printing inks, Jelinek, Zdenek: Necas, Miroslav; Stastny, Ladislav, Czech. CS 227,779.

*Primary Examiner*—Anthony Green
*Attorney, Agent, or Firm*—Joseph C. Gil; Richard E.L. Henderson

[57] ABSTRACT

This invention relates to a process for preparing pigment compositions by (a) treating an organic pigment with
   (1) a sterically hindered and/or bulky primary amine, and
   (2) a liquid in which the organic pigment is insoluble, and
(b) blending the resultant surface-treated pigment composition from step (a) with a pigment derivative of formula (I)

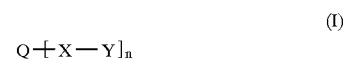

(I)

wherein

Q represents an organic pigment moiety,

X is O, S, NR$^1$, —SO$_2$—, —CO—, —Alk—, —Ar—, or combinations thereof,

Y is —OR$^2$, —NR$^3$R$^4$, or Het,

Alk is C$_1$–C$_5$ alkylene, C$_2$–C$_5$ alkenylene, or C$_4$–C$_5$ alkadienylene, or substituted derivatives thereof, Ar is arylene, R$^1$, R$^2$, R$^3$, and R$^4$ are independently hydrogen, C$_1$–C$_6$ alkyl, C$_5$–C$_7$ cycloalkyl, C$_7$–C$_{16}$ aralkyl, or C$_6$–C$_{10}$ aryl, Het is a heterocycle, and n is 1 to 4.

14 Claims, No Drawings

PROCESS FOR PREPARING ORGANIC PIGMENT COMPOSITIONS

BACKGROUND OF THE INVENTION

This invention relates to a process for preparing pigment compositions having improved rheology and brightness by surface treating organic pigments with combinations of certain sterically hindered and/or bulky primary amines and certain pigment derivatives.

Surface treatment is a type of finishing in which certain auxiliaries, such as rosin or other resins, are applied to pigments to influence their surface structure and thus their physical and coloristic properties. E.g., W. Herbst and K. Hunger, *Industrial Organic Pigments* (New York: VCH Publishers, Inc., 1993), pages 205–207. Surface treatment is a particularly useful method for improving pigment dispersibility in inks, toners, paints, coatings, and plastics.

The use of amines or amine derivatives in the preparation of pigment dispersions is known. For example, Czech Patent 227,779 discloses a two-step process for dispersing organic pigments in inks by first dispersing the pigments in the presence of ampholytic sulfonates of $C_{12}$–$C_{24}$ fatty acids and then coagulating the dispersed pigments with hydrophobic alkyl amines or ethoxylated $C_{12}$–$C_{24}$ fatty acids. European Patent Application 544,441 discloses dispersions of organic pigments in which the pigment is treated with a non-polar additive and dispersed in a solution containing a polar additive, including certain rosin amines or multifunctional amines. However, these two patents, besides requiring two-step treatments using two different types of dispersants, do not disclose the use of the sterically hindered and/or bulky primary amines that are a critical feature of the present invention.

Japanese Patent 63/305,172 discloses the dispersion of organic pigments in inks in the presence of certain surfactants, including stearylamine and stearylpropyleneamine. This patent, however, does not disclose the treatment of organic pigments with sterically hindered and/or bulky primary amines.

U.S. Pat. No. 4,929,279 discloses aqueous dispersions prepared by adding certain surfactants to an aqueous slurry of the pigment and then subjecting the treated pigment to ultrasonic irradiation. The surfactants include narrowly defined groups of diamines having two tertiary amino groups, two quaternary ammonium groups, or a combination of a secondary amino group with a primary amino group. This patent, however, does not disclose the treatment of organic pigments with the sterically hindered and/or bulky primary amines that are a critical feature of the present invention.

Certain ring-substituted pigment derivatives, such as sulfonamides, carboxamides, and heterocyclic-containing groups, have been reported to improve pigmentary properties. E.g., U.S. Pat. Nos. 5,457,203, 5,453,151, 5,424,429, 5,368,641, 5,334,727, 5,286,863, 5,264,032, 5,229,515, 5,194,088, 5,145,524, 5,137,576, 4,895,949, 4,844,742, 4,541,872, 4,478,968, 4,455,173, 4,439,240, 4,256,507, and 4,310,359. Such pigment derivatives, however, have not been used in conjunction with sterically hindered and/or bulky primary amines such as required in the present invention.

Surface treatment of organic pigments with mixtures of certain sterically hindered and/or bulky primary amines is known. For example copending U.S. application Ser. No. 08/769,477 (filed Dec. 20, 1996) now U.S. Pat. No. 5,728,206 discloses the use of a narrowly defined group of tertiary alkyl primary amines. Copending U.S. application Ser. No. 08/769,478 (filed Dec. 20, 1996) now U.S. Pat. No. 5,741,356 discloses the use of a broader class of sterically hindered and/or bulky primary amines but additionally requires ultrasonic irradiation during surface treatment. The process of the present invention, however, provides improved rheology and pigmentary properties without the need for ultrasonic irradiation.

The treatment of organic pigments with mixtures of sterically hindered and/or bulky primary amines and pigment derivatives according to the present invention provides pigment compositions having improved rheology and brightness that are particularly suited for use in high-solids coating compositions.

SUMMARY OF THE INVENTION

This invention relates to a process for preparing pigment compositions comprising
  (a) treating an organic pigment with
    (1) about 0.1 to about 100% by weight (preferably 5 to 20% by weight), relative to the organic pigment, of a sterically hindered and/or bulky primary amine, and
    (2) about 5 to about 15 parts by weight (preferably 6 to 12 parts by weight), per part by weight of the organic pigment, of a liquid in which the organic pigment is substantially insoluble, thereby forming a suspension of the surface-treated pigment composition in the liquid;
  (b) blending the surface-treated pigment composition from step (a) (preferably by dry blending after removal of the liquid (a)(2)) with about 0.1 to about 20% by weight (preferably 5 to 10% by weight), relative to the organic pigment, of at least one pigment derivative having the formula (I)

wherein
  Q represents an organic pigment moiety,
  X is O, S, NR$^1$, —SO$_2$—, —CO—, —Alk—, —Ar—, or chemically reasonable combinations thereof,
  Y is —OR$^2$, —NR$^3$R$^4$, or Het,
  Alk is $C_1$–$C_5$ alkylene, $C_2$–$C_5$ alkenylene, or $C_4$–$C_5$ alkadienylene, or substituted derivatives thereof,
  Ar is arylene (preferably ortho-phenylene or a substituted derivative thereof),
  R$^1$, R$^2$, R$^3$, and R$^4$ are independently hydrogen, $C_1$–$C_6$ alkyl, $C_5$–$C_7$ cycloalkyl, $C_7$–$C_{16}$ aralkyl, or $C_6$–$C_{10}$ aryl,
  Het is a heterocycle, and
  n is 1 to 4 (preferably 1 or 2); and
  (c) collecting the pigment composition.

This invention further relates to pigment compositions prepared by the process of this invention and to the use of such pigment compositions in the pigmentation of coatings, fibers, printing inks (including ink jet inks), plastics, and the like (preferably coatings and printing inks).

DETAILED DESCRIPTION OF THE INVENTION

Suitable organic pigments for the process of the present invention include quinacridone, phthalocyanine, and perylene pigments, as well as other known organic pigments. Mixtures, including co-precipitates and solid solutions, of such pigments are also suitable.

Quinacridone pigments are particularly suitable organic pigments. Quinacridones (which includes unsubstituted quinacridone, quinacridone derivatives, and solid solutions thereof) can be prepared by methods known in the art but are preferably prepared by thermally ring-closing various 2,5-dianilinoterephthalic acid precursors. E.g., S. S. Labana and L. L. Labana, "Quinacridones" in *Chemical Review*, 67, 1–18 (1967), and U.S. Pat. Nos. 3,157,659, 3,256,285, and 3,317,539. Suitable quinacridone pigments can be unsubstituted or substituted (for example, with one or more alkyl, alkoxy, halogens such as chlorine, or other substituents typical of quinacridone pigments).

Metal phthalocyanine pigments are also suitable organic pigments. Although copper phthalocyanines are preferred, other metal-containing phthalocyanine pigments, such as those based on zinc, cobalt, iron, nickel, and other such metals, may also be used. Suitable phthalocyanine pigments can be unsubstituted or partially substituted (for example, with one or more alkyl, alkoxy, halogens such as chlorine, or other substituents typical of phthalocyanine pigments).

Perylenes, particularly the diimides and dianhydrides of perylene-3,4,9,10-tetracarboxylic acid, are also suitable organic pigments. Suitable perylene pigments can be unsubstituted or substituted (for example, with one or more alkyl, alkoxy, halogens such as chlorine, or other substituents typical of perylene pigments)

Other suitable organic pigments include dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, and azo compounds, as well as substituted derivatives.

The organic pigment is first mixed in step (a) with a sterically hindered and/or bulky primary amine (a)(1) in a liquid (a)(2) in which the organic pigment is substantially insoluble.

Suitable sterically hindered primary amines (a)(1) are amines in which one or more primary amino groups are located in a sterically crowded region of the amine molecule or are attached to a sterically bulky aliphatic group. Although suitable primary amines (a)(1) are those in which the amino group is attached directly to a sterically crowded carbon atom, it is generally preferred to use amines in which the amino functionality is attached to a less hindered carbon atom, including a —$CH_2$— group, as long as the moiety to which the amino group is attached is sterically bulky. That is, the amino group of such amines is in a crowded region of the amine molecule but is still able to interact with the pigment surface being treated. Such amines are often highly branched. Regardless of whether the amines are considered sterically hindered, sterically bulky, or both, such amines are characterized by their being sufficiently hydrophobic that they remain adsorbed on the pigment surface in an aqueous or other polar medium. Amines (a)(1) can, of course, contain two or more amino groups as long as all such amino groups are located in a sterically crowded region of the amine molecule or are attached to a sterically bulky group.

Particularly preferred primary amines (a)(1) are compounds in which the amino group is not attached directly to a sterically crowded carbon atom but is instead attached to a group that is sterically bulky in the sense described above. Examples of suitable bulky primary amines of this type are rosin amines or rosinylamines and derivatives thereof, including dehydroabietylamine, dehydroabietan-1-amine, dihydroabietylamine, tetrahydroabietylamine, as well as dimeric, trimeric, tetrameric, or polymeric forms thereof, and mixtures thereof. Suitable amines (a)(1), which can be either natural or synthetic, can be used as free amines or as amine salts of inorganic or organic acids. A particularly preferred amine of this type is dehydroabietylamine, which has the formula (II),

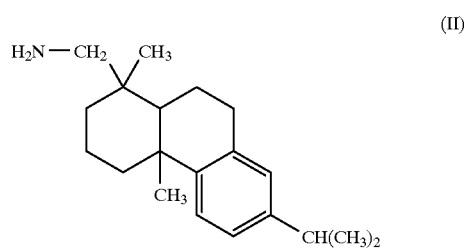

(II)

and salts thereof, such as acetate, formate, hydrochloride, phosphate, and sulfonate salts (including partial esters of polyfunctional acids). Dehydroabietylamine and its acetate salt are available from Hercules Incorporated (Wilmington, Del.).

Other suitable sterically hindered and/or bulky primary amines (a)(1) include tertiary alkyl primary amines having formula (III)

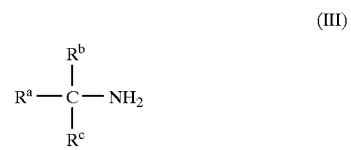

(III)

in which $R^a$ is a $C_5$–$C_{30}$ (cyclo)aliphatic group (preferably a $C_5$–$C_{22}$ aliphatic group), and $R^b$ and $R^c$ are independently $C_1$–$C_6$ alkyl (preferably methyl). The term "$C_1$–$C_6$ alkyl" refers to straight or branched chain aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The $R^b$ and $R^c$ groups, however, should not be branched at the carbon atom attached to the C—$NH_2$ group. The term "$C_5$–$C_{30}$ (cyclo)aliphatic" as used herein refers to branched and unbranched, saturated and unsaturated aliphatic groups, as well as groups consisting of or containing cycloaliphatic groups, having 5 to 30 carbon atoms. The $R^a$ group, however, is preferably not branched or unsaturated at the carbon atom attached directly to the C—$NH_2$ group. Examples of suitable $C_5$–$C_{30}$ (cyclo)aliphatic groups include $C_5$–$C_{30}$ alkyl, $C_5$–$C_{30}$ alkenyl, $C_5$–$C_{30}$ alkadienyl, $C_5$–$C_{30}$ alkatrienyl, as well as the isomeric branched forms thereof, and $C_5$–$C_8$ cycloalkyl, $C_5$–$C_8$ cycloalkenyl, and $C_5$–$C_8$ cycloalkadienyl. Examples of suitable $C_5$–$C_{30}$ (cyclo)aliphatic groups also include alkyl, alkenyl, alkadienyl, and alkatrienyl groups in which the main chain is interrupted with one or more $C_5$–$C_8$ cycloalkylene, $C_5$–$C_8$ cycloalkenylene, or $C_5$–$C_8$ cycloalkadienylene groups as long as the number of carbon atoms totals no more than 30 carbon atoms. Although generally not preferred, it is also possible to include (cyclo)aliphatic groups in which one or more of the (cyclo)aliphatic carbon atoms is substituted with halogen (such as fluorine or chlorine), $C_1$–$C_6$ alkoxy, or $C_6$–$C_{10}$ aromatic hydrocarbon (preferably phenyl or naphthyl) that can itself optionally be substituted. It is also possible, but much less preferred, to replace one or more non-adjacent (cyclo)aliphatic carbon atoms with an oxygen or sulfur atom or a $NR^i$ group (in which $R^i$ is $C_1$–$C_6$ alkyl or $C_6$–$C_{10}$ aryl). It is even possible to replace one or more non-adjacent aliphatic chain carbon atoms of the $R^a$ group with an aromatic ring, such as a benzene ring (although the resultant group would not in a formal sense be an "aliphatic" group). In general, the preferred tertiary alkyl primary amines are those in which the $R^a$ group is an acyclic aliphatic group having from 5 to 22 carbon atoms. The term "$C_5$–$C_{30}$ alkyl" as used for the $R^a$ group refers to alkyl groups having from 5 to 30 carbon atoms, such as pentyl, hexyl, lauryl (i.e., dodecyl), myristyl (i.e., tetradecyl), cetyl (i.e., hexadecyl), stearyl (i.e., octadecyl), eicosanyl, docosanyl, and isomeric forms thereof. The terms "$C_5$–$C_{30}$ alkenyl", "$C_5$–$C_{30}$ alkadienyl", and "$C_5$–$C_{30}$ alkatrienyl" refer to corresponding unsaturated groups having one, two, and three carbon-carbon double bonds, respectively. The term "$C_5$–$C_8$ cycloalkyl" refers to cycloaliphatic hydrocarbon groups having from 5 to 8 carbon atoms. Examples of $C_5$–$C_7$ cycloalkyl are cyclopentyl, cyclohexyl, cycloheptyl, and cyclooctyl. The terms "$C_5$–$C_8$ cycloalkenyl" and "$C_5$–$C_8$ cycloalkadienyl" refer to corresponding unsaturated cyclic groups having one and two carbon-carbon double bonds, respectively. The terms "$C_5$–$C_8$ cycloalkylene", "$C_5$–$C_8$ cycloalkenylene", and "$C_5$–$C_8$ cycloalkadienylene" refer to the corresponding difunctional cycloaliphatic groups. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_6$–$C_{10}$ aromatic hydrocarbon" refers to phenyl and 1- or 2-naphthyl, as well as phenyl and naphthyl groups substituted with $C_1$–$C_6$ alkyl, $C_1$–$C_6$ alkoxy, or halogen. Examples of suitable halogen are fluorine, chlorine, and bromine. Suitable tertiary alkyl primary amines are available commercially under the name PRIMENE from Rohm and Haas Company (Philadelphia, Pa.).

Other additives, particularly surfactants other than the sterically hindered and/or bulky primary amines (a)(1), can also be included as optional components during surface treatment step (a). Suitable surfactants include non-ionic, cationic, zwitterionic, amphoteric, and anionic surfactants known in the art. Such other surfactants, if used at all, are preferably anionic surfactants containing carboxylate, sulfonate, phosphate, or phosphonate groups, either as the free acids or as the alkali metal, alkaline earth metal, or ammonium salts (especially the sodium or potassium salts). Particularly preferred anionic surfactants are sulfosuccinates, sulfosuccinamates, and derivatives thereof. Other suitable anionic dispersants include neodecanoic acid, sodium N-methyl-N-oleoyl taurate, sulfonated aliphatic polyesters, and aromatic sulfonate dispersants. Suitable non-ionic surfactants include ethoxylated fatty acids and amides, ethoxylated alcohols, ethoxylated alkylphenols, and glycol esters. Suitable cationic surfactants include ethoxylated and/or propoxylated amines, diamines, and quaternary ammonium salts. Suitable amphoteric and zwitterionic surfactants include amine oxides and betaine derivatives. Mixtures of surfactants are, of course, also suitable.

Additional additives other than the above surfactants include wood resins, such as abietic acid and salts thereof, cycloaliphatic acids and salts thereof, and various polymeric dispersants.

Surface treatment step (a) is carried in a liquid (a)(2) in which the organic pigment is substantially insoluble and which is suitably stable under the conditions used in the process of the invention. Preferred liquids (a)(2) include water, water-miscible organic liquids (such as methanol, or other lower aliphatic alcohols), or mixtures thereof. It is desirable, but not necessary, for the sterically hindered and/or bulky primary amines (a)(1) to be at least partly insoluble in liquid (a)(2). Surfactants and any other such optional components are often soluble in liquid (a)(2) but solubility is not an essential feature. Examples of suitable liquids (a)(2) are water and/or water-miscible organic liquids, including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

Surface treatment step (a) is generally carried out after the crude pigment is initially isolated following chemical synthesis. However, it is often advantageous to drown the final preparative reaction mixture into liquid (a)(2) to which has already been added at least a portion of the sterically hindered and/or bulky primary amine (a)(1), as well as other additives. In the second variant, surface treatment step (a) takes place as part of the drown process.

The temperature at which surface treatment is carried out is generally not critical but is usually maintained between about 5° C. and about 300° C. (preferably about 25° C. and about 200° C.). Although the upper limit for the temperature is often determined by the boiling point of the liquid being used, it is often advantageous to carry out the surface treatment under pressure, which allows the use of higher temperatures. It is sometimes possible to achieve improved results, even at the lower temperatures, by exposing the mixture to ultrasound.

The treated organic pigment from step (a) is then blended with pigment derivatives in step (b). When using the preferred dry-blending method, it is first necessary to remove liquid (a)(2), for example, by filtration, centrifugation, and even decantation. Drying, while generally desirable, is sometimes not necessary. It is also possible to carry out blending step (b) in the presence of liquid (a)(2) or even a different non-solvent liquid from that used in step (a).

Pigment derivatives (b) are compounds having the formula (I)

in which Q represents an organic pigment moiety; X contains one or more O, S, $NR^1$ (where $R^1$ can be hydrogen, $C_1$–$C_6$ alkyl, $C_5$–$C_7$ cycloalkyl, $C_7$–$C_{16}$ aralkyl, or $C_6$–$C_{10}$ aryl), —$SO_2$—, —CO—, —Alk—, —Ar—, or any chemically reasonable combinations of two or more such units; Y is $OR^2$ (preferably in as carboxylic or sulfonic ester) or —$NR^3R^4$ (preferably as a carboxamide or sulfonamide), where $R^2$, $R^3$, and $R^4$ are independently hydrogen, $C_1$–$C_6$ alkyl, $C_5$–$C_7$ cycloalkyl, $C_7$–$C_{16}$ aralkyl, or $C_6$–$C_{10}$ aryl, or is a heterocycle; and n is from 1 to 4.

The Alk groups that can be present in pigment derivatives (b) can be $C_1$–$C_5$ alkylene, $C_2$–$C_5$ alkenylene, or $C_4$–$C_5$ alkadienylene, or substituted derivatives thereof. The term "$C_1$–$C_5$ alkylene" refers to straight or branched chain difunctional aliphatic hydrocarbon groups having from 1 to 5 carbon atoms. Examples of $C_1$–$C_5$ alkylene are methylene, ethylene, propylene, butylene, and pentylene, each of which can optionally be substituted. The term "$C_2$–$C_5$ alkenylene"

refers to straight or branched chain difunctional aliphatic hydrocarbon groups having from 2 to 5 carbon atoms and one main-chain carbon-carbon double bond. Examples of $C_2$–$C_5$ alkenylene include ethenylene (i.e., vinylene), propenylene, butenylene, and pentenylene, each of which can optionally be substituted. The term "$C_4$–$C_5$ alkadienylene" refers to straight or branched chain difunctional aliphatic hydrocarbon groups having from 4 or 5 carbon atoms and two main-chain carbon-carbon double bonds. Examples of $C_4$–$C_5$ alkadienylene include butadienylene and pentadienylene, each of which can optionally be substituted. The $C_1$–$C_5$ alkylene, $C_2$–$C_5$ alkenylene, and $C_4$–$C_5$ alkadienylene groups can be substituted with one or more substituents, such as $C_1$–$C_6$ alkoxy, $C_5$–$C_7$ cycloalkyl, $C_5$–$C_7$ cycloalkyl, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, nitrile, carboxyl or amides thereof, sulfonyl (such as alkyl- and arylsulfonyl or sulfoxyl and amides thereof groups or combinations thereof.

The Ar groups that can be present in pigment derivatives (b) can be arylene groups, including heteroarylene groups in which one or more ring carbon atoms of an arylene group are each replaced by a O, S, or N in a chemically reasonable manner, as long as the overall ring size is 4 to 7. Suitable arylene groups also include derivatives in which one or more ring atoms are substituted with $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, nitrile, carboxyl or amides thereof, sulfonyl (such as alkyl- and arylsulfonyl or sulfoxyl and amides thereof) groups or combinations thereof. Preferred arylene groups are $C_6$–$C_{10}$ arylene groups, especially ortho-phenylene and naphthalene having various ortho- and 1,8-substitution patterns. The preferred $C_6$–$C_{10}$ arylene groups also include derivatives substituted with the substituents described above and, less preferably, polyaromatic derivatives in which one or two pairs of adjacent ring atoms of the $C_6$–$C_{10}$ arylene group are fused with additional aromatic rings (such as benzene or heteroaromatic analogs thereof to form, for example, anthracenes, phenanthrenes and the like), which can themselves be ring-substituted as described above or contain one or more ring heteroatoms selected from O, S, and N.

The Het groups are heterocyclic groups, preferably heteroaromatic groups, containing one or ring heteroatoms (preferably selected from N, O, and S). Suitable heteroaromatic groups are aromatic species that contain one or more ring heteroatoms and that are attached at a ring atom to linking group X. Examples of suitable heteroaromatic groups include those derived from pyrrole, imidazole, pyrazole, pyridine, pyrazine, pyrimidine, pyridazine, triazine, furan, thiophene, isoxazole, isothiazole, and furazan or derivatives thereof in which one or more ring atoms are substituted with $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, hydroxy, halogen, nitrile, carboxyl or amides thereof, sulfonyl (such as alkyl- and arylsulfonyl or sulfoxyl and amides thereof) groups or combinations thereof. Although some of the above Het groups, such as furan, may exhibit a low degree of aromaticity, such compounds can be considered heteroaromatic for the purposes of this invention if no more than one hydrogen atom or substituent is attached to each ring atom. Suitable, although generally less preferred, heteroaromatic groups also include polyaromatic derivatives in which one or two pairs of adjacent ring atoms are fused with one or two aromatic rings (such as benzene or heteroaromatic analogs thereof) that can themselves be ring-substituted as described above or contain one or more ring heteroatoms selected from O, S, and N. Examples of suitable such polyaromatic heterocyclic groups include those based on indole, isoindole, and indolazine (i.e., benzo derivatives of pyrrole), carbazole (i.e., a dibenzo derivative of pyrrole), indazole, benzimidazole, quinoline, isoquinoline, and quinolazine (i.e., benzo derivatives of pyridine), quinazoline, quinoxaline, cinnoline, purine, benzofuran and isobenzofuran (i.e., benzo derivatives of furan), phenoxazine, benzothiazine, naphthothiophene, and thianthrene, as well as ring-substituted derivatives thereof. Particularly preferred heteroaromatic groups are those derived from pyrazole (especially 3,5-dimethylpyrazole attached at the 1-nitrogen atom to linking group X), pyridine, furan, and thiophene. Although generally less preferred, Het can also be known non-aromatic heterocyclic groups having five- to eight-membered rings, such as those formed when $R^3$ and $R^4$ together are a difunctional aliphatic group that may optionally contain one or more additional heteroatoms (such as O, S, or N) and one or more double bonds (as long as the heterocycle is not aromatic).

The terms "$C_1$–$C_6$ alkyl" and "$C_1$–$C_6$ alkoxy" as used in the definition of pigment derivatives (b) have the same meanings as used above with respect to amines (a)(1). The term "$C_5$–$C_7$ cycloalkyl" refers to cycloaliphatic hydrocarbons groups having from 5 to 7 carbon atoms. Examples of $C_5$–$C_7$ cycloalkyl are cyclopentyl, cyclohexyl, and cycloheptyl. The term "$C_5$–$C_7$ cycloalkoxy" refers to cycloalkyl oxy groups having from 5 to 7 carbon atoms. Examples of $C_5$–$C_7$ cycloalkoxy are cyclopentyloxy, cyclohexyloxy, and cycloheptyloxy. The term "$C_6$–$C_{10}$ aryl" refers to phenyl and 1- or 2-naphthyl, as well as to phenyl and naphthyl groups substituted with alkyl, alkoxy, halogen, cyano, as defined herein. The term "$C_6$–$C_{10}$ aryloxy" refers to phenoxy and 1- or 2-naphthoxy, in which the aryl portion can optionally be substituted as described above for "aryl." The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "$C_7$–$C_{16}$ aralkoxy" refers to $C_1$–$C_6$ alkoxy substituted with $C_6$–$C_{10}$ aryl such that the total number of carbon atoms is from 7 to 16. An example of $C_7$–$C_{16}$ aralkoxy is benzyloxy. Examples of halogen are fluorine, chlorine, bromine, and iodine.

Preferred pigments derivatives (b) include quinacridone sulfonic acid and salts thereof or quinacridone sulfonamides, such as quinacridone (diethylaminopropyl)sulfonamide, quinacridone bis(diethylaminopropyl)sulfonamide), and 2-phthalimidomethylquinacridone.

The resultant pigment composition is collected in step (c) by methods known in the art but is preferably collected by filtration followed by washing. Other collection methods known in the art, such as centrifugation or even simple decantation, are suitable but generally less preferred. The pigment composition is then dried for use or for further manipulation before ultimate use.

The pigments of this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials). Because of their light stability and migration properties, the pigments according to the present invention are suitable for many different pigment applications. For example, pigments prepared according to the invention can be used as the colorant (or as one of two or more colorants) for lightfast pigmented systems.

The pigments of the present invention are suitable for pigmented mixtures with other materials, pigment formulations, paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers, Printing inks include those known for use in paper, textile, and tinplate printing.

It is also possible to use pigments of the present invention to impart color to macromolecular materials, especially synthetically produced macromolecular substances. Examples of synthetic macro-molecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form, including molded articles, films, and fibers.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Quinacridones

Except as otherwise indicated, quinacridone, 2,9-dimethylquinacridone, and 2,9-dichloroquinacridone were prepared according to the method described in U.S. Pat. No. 3,342,828 and obtained in crude presscake form by drowning the reaction mixtures in methanol. The resultant crude pigments were collected but not conditioned or surface treated.

Sterically hindered and bulky primary amines

The following sterically hindered and bulky primary amines according to the invention were used in the Examples:

Amine A Dehydroabietylamine acetate available as Amine D Acetate from Hercules Inc. (Wilmington, Del.)

Amine B A tertiary $C_{16}$–$C_{22}$ amine available as PRIMENE® JM-T from Rohm and Haas Company, Philadelphia, Pa.

Solvent-based paint tests

Unless otherwise noted, solvent-based paint tests were carried out using a generic alkyd melamine paint system. Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 $\mu$m and 38 $\mu$m wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Hüls America), and 50% TI-PURE® R-960 TiO$_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a TiO$_2$-to-pigment ratio of 90:10. Color measurements were made using films applied at 76 $\mu$m wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 $\mu$m wet film thickness and flashed at room temperature for 30 minutes and at 121° C. for 30 minutes.

Rheological determinations

Viscosities of pigment concentrates prepared according to the examples in solvent-based paint systems by the Brookfield method. Viscosities were rated according to the following scale, where higher values indicate lower viscosities and thus better rheological properties:

| | |
|---|---|
| Thin liquid | 5 |
| Liquid | 4 |
| Thick liquid | 3 |
| Sluggish | 2 |
| Very sluggish | 1 |

The following commercially available pigments were used as comparison standards in some of the rheology tests:

Standard A 2,9-Dimethylquinacridone available as QUINDO® Magenta RV-6832 from Bayer Corporation Standard B 2,9-Dichloroquinacridone available as MONASTRAL® Magenta RT-343-D from Ciba Specialty Chemicals Examples 1–8 Dimethylquinacridone and solid solutions thereof Example 1 (comparison)

2,9-Dimethylquinacridone was prepared using a surfactant but without using a sterically hindered or bulky primary amine or a pigment derivative.

Crude 2,9-dimethylquinacridone presscake (206 g, corresponding to 60.0 g of 100% strength pigment) was reslurried in 800 g of water and the pH was adjusted to 9.0. The slurry was heated at 140–145° C. for two hours in a laboratory Parr reactor. The mixture was allowed to cool to 60° C. and pH was adjusted to 3.8 with phosphoric acid. An aqueous emulsion containing 2.6 g of an anionic sulfosuccinate surfactant and 35.0 g of a petroleum distillate was added and the resultant mixture was stirred at 45° C. for three hours, after which the solid component was collected by filtration and washed with water. The wet presscake was dried in an oven at 60° C. overnight to yield 62.4 g of a magenta (i.e., red-violet) comparison pigment having poor rheological properties. Viscosity results are shown in Table 1.

Example 2 (comparison)

2,9-Dimethylquinacridone was prepared using a sterically hindered and/or bulky primary amine but without using a pigment derivative or a surfactant.

Crude 2,9-dimethylquinacridone presscake (206 g, corresponding to 60.0 g of 100% strength pigment) was reslurried in 800 g of water and the pH was adjusted to 4.0. An aqueous solution containing 3.0 g of Amine A was added and the slurry was stirred for 30 minutes. The slurry was adjusted to pH 9.2 and stirred for two hours, then heated at 140–145° C. for an additional two hours in a laboratory Parr reactor. After the mixture was allowed to cool to room temperature, the solid component was collected by filtration and washed with water. The wet presscake was dried in an oven at 60° C. overnight to yield 64.0 g of a magenta comparison pigment having only slightly better rheological properties than the pigment of comparison Example 1. Viscosity results are shown in Table 1.

A high-solids acrylic thermoset solvent-based paint prepared using this comparison pigment exhibited an increased chroma in tint and increased metallic brightness compared to a paint prepared using the pigment of comparison Example 1.

Example 3

2,9-Dimethylquinacridone was prepared using a sterically hindered and/or bulky primary amine, a surfactant, and a pigment derivative.

2,9-Dimethylquinacridone prepared according to comparison Example 1 was dry-blended with 10% by weight of quinacridone bis(diethylaminopropyl)sulfonamide (prepared by the general method described in U.S. Pat. No. 4,310,359). The resultant pigment exhibited better rheological properties than the pigment of comparison Example 1. Viscosity results are shown in Table 1.

Example 4

2,9-Dimethylquinacridone was prepared using a sterically hindered and/or bulky primary amine and a pigment derivative but without using a surfactant.

2,9-Dimethylquinacridone prepared according to comparison Example 2 was dry-blended with 10% by weight of quinacridone bis(diethylaminopropyl)sulfonamide. The resultant pigment exhibited better rheological properties than the pigment of comparison Example 2. Viscosity results are shown in Table 1.

TABLE 1

Viscosities for the 2,9-Dimethylquinacridone Pigments in a High-solids Acrylic Thermoset Solvent-based Paint

| Test Sample | Viscosity |
| --- | --- |
| Standard A | 1 |
| Example 1 (comparison) | 1 |
| Example 2 (comparison) | 1–2 |
| Example 3 | 2–3 |
| Example 4 | 3 |

Example 5 (comparison)

A solid solution of 2,9-dimethylquinacridone (95% by weight) and 2,9-dimethoxyquinacridone (5% by weight) was prepared using a sterically hindered and/or bulky primary amine but without using a pigment derivative.

To 445 g of polyphosphoric acid (112% phosphoric acid) heated at 80° C. were sequentially added 5 g of 2,5-di(4-methoxyanilino)terephthalic acid (over a period of 15 minutes) and 95 g of 2,5-di(4-methylanilino)terephthalic acid (over a period of 30 minutes), the temperature being maintained below 100° C. by adjustment of the addition rate. The reaction mixture was heated at 120–125° C. for four hours. The melt was cooled to 95° C. and slowly poured into 840 g of methanol, the temperature being maintained below 60° C. by external cooling and adjustment of melt addition rate. The slurry was heated at reflux for one hour, cooled to below 60° C., and diluted with water, after which the solid component was collected by filtration and washed with water until acid free. The resultant presscake was reslurried in water, after which the slurry was treated with 95 g of 50% sodium hydroxide and heated at 90° C. for two hours. After the slurry was cooled, the solid component was collected by filtration, washed with water until alkali free, and again slurried in water. After adjusting the pH of the slurry to 4.1, an aqueous solution containing 4.6 g of Amine A was added and the slurry was stirred for 30 minutes. The slurry was adjusted to pH 9.0 and stirred for two hours, then heated at 140–145° C. for an additional two hours in a laboratory Parr reactor. The mixture was allowed to cool to room temperature, after which the solid component was collected by filtration and washed with water. The wet presscake was dried in an oven at 60° C. overnight to yield 85.3 g of a magenta comparison pigment. Viscosity results are shown in Table 2.

A solvent-based paint prepared as described above exhibited a more transparent masstone, cleaner hue, and increased metallic brightness compared to a paint prepared using the comparison 2,9-dimethylquinacridone pigment of Example 1.

Example 6

A solid solution of 2,9-dimethylquinacridone (95% by weight) and 2,9-dimethoxyquinacridone (5% by weight) was prepared using a sterically hindered and/or bulky primary amine and a pigment derivative.

A solid solution pigment prepared according to comparison Example 5 was dry-blended with 5% by weight of 2-phthalimidomethylquinacridone (prepared by the general method described in U.S. Pat. No. 3,275,637). The resultant pigment exhibited much better rheological properties than the pigment of comparison Example 5. Viscosity results are shown in Table 2.

TABLE 2

Viscosities for the Solid Solution Pigments

| Test Sample | Viscosity |
|---|---|
| Example 5 (comparison) | 1–2 |
| Example 6 | 4 |

Example 7 (comparison)

A solid solution of 2,9-dimethylquinacridone (90% by weight) and quinacridone (10% by weight) was prepared using a surfactant but without using a sterically hindered and/or bulky primary amine or a pigment derivative.

To 286 g of polyphosphoric acid (112% phosphoric acid) heated at 85° C. were sequentially added 6.5 g of 2,5-dianilinoterephthalic acid (over a period of 5 minutes) and 58.5 g of 2,5-di(4-methylanilino)terephthalic acid (over a period of 20 minutes), the temperature being maintained below 110° C. by adjustment of the addition rate. The reaction mixture was heated at 120–125° C. for two hours. The melt was cooled to 90° C. and slowly poured into 800 g of water. The resultant slurry was stirred for one hour, after which the solid component was collected by filtration and washed with water until acid free. The resultant presscake was reslurried in water, after which the slurry was treated with 58.5 g of 50% sodium hydroxide and heated at 90° C. for one hour. After the slurry was cooled, the solid component was collected by filtration, washed with water until alkali free, and again slurried in water. The slurry was adjusted to pH 9.1 and heated at 140–145° C. for two hours in a laboratory Parr reactor. The slurry was allowed to cool to room temperature and adjusted to pH 3.6. An aqueous emulsion containing 2.2 g of an anionic sulfosuccinate surfactant and 28.0 g of a petroleum distillate was added and the resultant mixture was stirred at room temperature for three hours. The solid component was collected by filtration and washed with water. The wet presscake was dried in an oven at 60° C. overnight to yield a magenta comparison pigment.

Example 8 (comparison)

A solid solution of 2,9-dimethylquinacridone (90% by weight) and quinacridone (10% by weight) was prepared using a surfactant and a pigment derivative but without using a sterically hindered and/or bulky primary amine.

A solid solution pigment prepared according to comparison Example 7 was dry-blended with 10% by weight of quinacridone (diethylaminopropyl)sulfonamide.

A solvent-based paint prepared as described above exhibited a deeper masstone, a weaker and much duller tint, and a greatly decreased metallic brightness and had a lower viscosity compared to a paint prepared using the comparison pigment of Example 7. That is, use of the pigment derivative improved the rheological properties but worsened the color properties.

Example 9 (comparison)

A solid solution of 2,9-dimethylquinacridone (90% by weight) and quinacridone (10% by weight) was prepared using a sterically hindered and/or bulky primary amine (added during the drown process) and a surfactant but without using a pigment derivative.

To 286 g of polyphosphoric acid (112% phosphoric acid) heated at 85° C. were sequentially added 6.5 g of 2,5-dianilinoterephthalic acid (over a period of 5 minutes) and 58.5 g of 2,5-di(4-methylanilino)terephthalic acid (over a period of 20 minutes), the temperature being maintained below 110° C. by adjustment of the addition rate. The reaction mixture was heated at 120–125° C. for two hours. The melt was cooled to 90° C. and slowly poured into 800 g of water containing 6.5 g of a 50% aqueous solution of Amine A. The resultant slurry was stirred for one hour, after which the solid component was collected by filtration and washed with water until acid free. The resultant presscake was reslurried in water, after which the slurry was treated with 58.5 g of 50% sodium hydroxide and heated at 90° C. for one hour. After the slurry was cooled, the solid component was collected by filtration, washed with water until alkali free, and again slurried in water. The slurry was adjusted to pH 4 and stirred for thirty minutes, then adjusted to pH 9.1 and heated at 140–145° C. for two hours in a laboratory Parr reactor. The slurry was allowed to cool to room temperature and adjusted to pH 3.6. An aqueous emulsion containing 1.8 g of an anionic sulfosuccinate surfactant and 28.0 g of a petroleum distillate was added and the resultant mixture was stirred at room temperature for three hours. The solid component was collected by filtration and washed with water. The wet presscake was dried in an oven at 60° C. overnight to yield 54.2 g of a magenta comparison pigment.

A solvent-based paint prepared as described above exhibited a deeper masstone, a slightly brighter and slightly yellowed tint, and an increased metallic brightness and had a higher viscosity compared to a paint prepared using the comparison pigment of Example 7. That is, use of the amine improved color properties but worsened rheological properties.

Example 10

A solid solution of 2,9-dimethylquinacridone (90% by weight) and quinacridone (10% by weight) was prepared using a sterically hindered and/or bulky primary amine, a surfactant, and a pigment derivative.

A solid solution pigment prepared according to comparison Example 9 was dry-blended with 10% by weight of quinacridone (diethylaminopropyl)sulfonamide.

A solvent-based paint prepared as described above exhibited a deeper masstone, a weaker and duller tint, and a slightly decreased metallic brightness but had a slightly lower viscosity compared to a paint prepared using the comparison pigment of Example 7 (which used no amine or pigment derivative); exhibited a deeper masstone, a brighter and slightly yellower tint, and a greatly increased metallic brightness but had a slightly higher viscosity compared to a paint prepared using the comparison pigment of Example 8 (which used a pigment derivative but no amine); and exhibited a slightly deeper masstone, a slightly bluer tint, and a slightly increased metallic brightness and had a much lower viscosity compared to a paint prepared using the comparison pigment of Example 9 (which used an amine but no pigment derivative).

The data for Examples 7 to 10 show that the use of both an amine and a pigment derivative according to the invention improved both color and rheological properties.

Example 11

A solid solution of 2,9-dimethylquinacridone (90% by weight) and quinacridone (10% by weight) was prepared using a sterically hindered and/or bulky primary amine, a surfactant, and a pigment derivative.

A solid solution pigment prepared according to comparison Example 9 was dry-blended with 10% by weight of quinacridone bis(diethylaminopropyl)sulfonamide.

A water-based architectural coating exhibited increased brightness compared to a coating prepared using the pigment of comparison Example 9.

Example 12

A solid solution of 2,9-dimethylquinacridone (90% by weight) and quinacridone (10% by weight) was prepared using a sterically hindered and/or bulky primary amine, a surfactant, and a pigment derivative.

A solid solution pigment prepared according to comparison Example 9 was dry-blended with 5% by weight of 2-phthalimidomethylquinacridone.

A solvent-based paint prepared as described above exhibited a much deeper masstone, a weaker and slightly duller tint, and a slightly red metallic but had a much lower viscosity compared to a paint prepared using the comparison pigment of Example 7.

Example 13 (comparison)

A solid solution of 2,9-dimethylquinacridone (90% by weight) and quinacridone (10% by weight) was prepared using a sterically hindered and/or bulky primary amine (added after the drown process) and a surfactant but without using a pigment derivative.

To 286 g of polyphosphoric acid (112% phosphoric acid) heated at 85° C. were sequentially added 6.5 g of 2,5-dianilinoterephthalic acid (over a period of 5 minutes) and 58.5 g of 2,5-di(4-methylanilino)terephthalic acid (over a period of 20 minutes), the temperature being maintained below 110° C. by adjustment of the addition rate. The reaction mixture was heated at 120–125° C. for two hours. The melt was cooled to 90° C. and slowly poured into 800 g of water. The resultant slurry was stirred for one hour, after which the solid component was collected by filtration and washed with water until acid free. The resultant presscake was reslurried in water, after which the slurry was treated with 58.5 g of 50% sodium hydroxide and heated at 90° C. for one hour. After the slurry was cooled, the solid component was collected by filtration and washed with water until alkali free. A 132.5 g portion (corresponding to 25.5 g of 100% strength pigment) was reslurried in water and an aqueous solution containing 2.7 g of Amine A was then added. The slurry was adjusted to pH 4 and stirred for thirty minutes, then adjusted to pH 10.5 and heated at 140–145° C. for two hours in a laboratory Parr reactor. The slurry was allowed to cool to room temperature and adjusted to pH 3.6. An aqueous emulsion containing 0.8 g of an anionic sulfosuccinate surfactant and 12.5 g of a petroleum distillate was added and the resultant mixture was stirred at room temperature for three hours. The solid component was collected by filtration and washed with water. The wet presscake was dried in an oven at 60° C. overnight to yield 25.4 g of a magenta comparison pigment.

Example 14

A solid solution of 2,9-dimethylquinacridone (90% by weight) and quinacridone (10% by weight) was prepared using a sterically hindered and/or bulky primary amine (added after the drown process), a surfactant, and a pigment derivative.

A solid solution pigment prepared according to comparison Example 13 was dry-blended with 10% by weight of quinacridone (diethylaminopropyl)sulfonamide.

A solvent-based paint prepared as described above exhibited a slightly deeper masstone, a slightly weaker and slightly duller tint, and a slightly stronger and slightly duller metallic but had a much lower viscosity compared to a paint prepared using the comparison pigment of Example 13.

Examples 15–18 Dichloroquinacridone

Example 15 (comparison)

2,9-Dichloroquinacridone was prepared using a sterically hindered and/or bulky primary amine but without using a pigment derivative.

Crude 2,9-dichloroquinacridone presscake (270 g, corresponding to 90.0 g of 100% strength pigment) was reslurried in 900 g of water and the pH was adjusted to 3.3. An aqueous solution of 4.0 g of Amine A was added and the slurry was stirred for 30 minutes. The slurry was adjusted to pH 9.2 and stirred for two hours, then heated at 140–145° C. for an additional two hours in a laboratory Parr reactor. The mixture was allowed to cool to room temperature, after which the resultant slurry was filtered and washed with water. The wet presscake was dried in the oven at 60° C. overnight to yield 93.0 g of a magenta comparison pigment. Viscosity results are shown in Table 3.

Example 16

2,9-Dichloroquinacridone was prepared using a sterically hindered and/or bulky primary amine and a pigment derivative.

2,9-Dichloroquinacridone prepared according to comparison Example 15 was dry-blended with 10% by weight of quinacridone bis(diethylaminopropyl)sulfonamide. The resultant pigment exhibited better rheological properties than Standard B (a commercially available 2,9-dichloroquinacridone). Viscosity results are shown in Table 3.

Example 17 (comparison)

2,9-Dichloroquinacridone was prepared using a tertiary amine according to the invention but without using a pigment derivative.

Crude 2,9-dichloroquinacridone presscake (300 g, corresponding to 100.0 g of 100% strength pigment) was reslurried in 690 g of water. After 18 g of Amine B was added, the slurry was heated at 140–145° C. for two hours in a laboratory Parr reactor. The mixture was allowed to cool to room temperature, after which the resultant slurry was filtered and washed with water. The wet presscake was dried in the oven at 60° C. overnight to yield 115 g of a magenta comparison pigment. Viscosity results are shown in Table 3.

Example 18

2,9-Dichloroquinacridone was prepared using a sterically hindered and/or bulky primary amine and a pigment derivative.

2,9-Dichloroquinacridone prepared according to comparison Example 17 was dry-blended with 10% by weight of quinacridone bis(diethylaminopropyl)sulfonamide. The resultant pigment exhibited slightly better rheological properties than Standard B (a commercially available 2,9-dichloroquinacridone). Viscosity results are shown in Table 3.

TABLE 3

Viscosities for the 2,9-Dichloroquinacridone Pigments in a
High-solids Acrylic Thermoset Solvent-based Paint

| Test Sample | Viscosity |
|---|---|
| Standard B | 2–3 |
| Example 15 (comparison) | 3–4 |
| Example 16 | 4 |
| Example 17 (comparison) | 1 |
| Example 18 | 3–4 |

What is claimed is:

1. A process for preparing a pigment composition comprising
   (a) treating an organic pigment with
   (1) about 0.1 to about 100% by weight, relative to the organic pigment, of a sterically hindered and/or bulky primary amine, and
   (2) about 5 to about 15 parts by weight per part by weight of the organic pigment of a liquid in which the organic pigment is substantially insoluble,
   thereby forming a suspension of a surface-treated pigment composition in the liquid;
   (b) blending the surface-treated pigment composition from step (a) with about 0.1 to about 20% by weight, relative to the organic pigment, of at least one pigment derivative having the formula (I)

$$Q\text{---}[X\text{---}Y]_n \qquad (I)$$

wherein
   Q represents an organic pigment moiety,
   X is O, S, $NR^1$, —$SO_2$—, —CO—, —Alk—, —Ar—, or combinations thereof,
   Y is —$OR^2$, —$NR^3R^4$, or Het,
   Alk is $C_1$–$C_5$ alkylene, $C_2$–$C_5$ alkenylene, or $C_4$–$C_5$ alkadienylene, or substituted derivatives thereof,
   Ar is arylene,
   $R^1$, $R^2$, $R^3$, and $R^4$ are independently hydrogen, $C_1$–$C_6$ alkyl, $C_5$–$C_7$ cycloalkyl, $C_7$–$C_{16}$ aralkyl, or $C_6$–$C_{10}$ aryl,
   Het is a heterocycle, and
   n is 1 to 4; and
   (c) collecting the pigment composition.

2. A process according to claim 1 wherein the organic pigment is treated in step (a) with 5 to 20% by weight, relative to the organic pigment, of a sterically hindered and/or bulky primary amine.

3. A process according to claim 1 wherein the sterically hindered and/or bulky primary amine (a)(1) is a rosin amine, a rosinylamine, or a derivative thereof.

4. A process according to claim 1 wherein the sterically hindered and/or bulky primary amine (a)(1) is dehydroabietylamine.

5. A process according to claim 1 wherein the sterically hindered and/or bulky primary amine (a)(1) is a tertiary alkyl primary amine having the formula

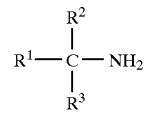

wherein $R^1$ is a $C_5$–$C_{30}$ (cyclo)aliphatic group, and $R^2$ and $R^3$ are independently $C_1$–$C_6$ alkyl.

6. A process according to claim 1 wherein the sterically hindered and/or bulky primary amine (a)(1) is a tertiary alkyl primary amine having the formula

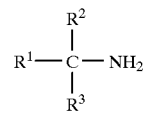

wherein $R^1$ is a $C_5$–$C_{22}$ aliphatic group, and $R^2$ and $R^3$ are methyl.

7. A process according to claim 1 wherein 6 to 12 parts by weight per part by weight of the organic pigment of liquid (a)(2) is used.

8. A process according to claim 1 wherein liquid (a)(2) is water, a water-miscible organic liquid, or a mixture thereof.

9. A process according to claim 1 wherein the surface-treated pigment composition from step (a) is treated in step (b) with 6 to 12% by weight, relative to the organic pigment, of the pigment derivative.

10. A process according to claim 1 wherein pigment derivative (b) is quinacridone sulfonic acid or a salt thereof or quinacridone(diethylaminopropyl)sulfonamide, quinacridone bis(diethylaminopropyl)sulfonamide), or 2-phthalimidomethylquinacridone.

11. A process according to claim 1 wherein the pigment composition is collected in step (c) by filtration.

12. A pigment composition prepared according to the process of claim 1.

13. A pigmented coating composition containing as pigment a pigment composition prepared according to claim 1.

14. A pigmented printing ink containing as pigment a pigment composition prepared according to claim 1.

* * * * *